United States Patent
Walukiewicz

(10) Patent No.: US 6,510,454 B1
(45) Date of Patent: Jan. 21, 2003

(54) NETWORK DEVICE MONITORING WITH E-MAIL REPORTING

(75) Inventor: Miroslaw Walukiewicz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/288,370

(22) Filed: Apr. 8, 1999

Related U.S. Application Data

(60) Provisional application No. 60/082,492, filed on Apr. 21, 1998.

(51) Int. Cl.$^7$ ............................................. G06F 15/15
(52) U.S. Cl. ................... 709/206; 709/200; 709/224; 709/230; 709/250
(58) Field of Search .................... 709/200, 202–203, 709/206–208, 223–224, 230–231, 245–247, 250–251

(56) References Cited

U.S. PATENT DOCUMENTS

| | | | | |
|---|---|---|---|---|
| 5,315,711 | A | * 5/1994 | Barone et al. | 709/208 |
| 5,787,253 | A | * 7/1998 | McCreery et al. | 709/231 |
| 5,828,978 | A | * 10/1998 | Anand et al. | 370/220 |
| 6,003,070 | A | * 12/1999 | Frantz | 709/206 |
| 6,219,694 | B1 | * 4/2001 | Lazaridis et al. | 709/206 |
| 6,278,357 | B1 | * 8/2001 | Croushore et al. | 340/310.01 |
| 6,279,038 | B1 | * 8/2001 | Hogan et al. | 709/224 |
| 6,310,550 | B1 | * 10/2001 | Wagener | 340/568 |
| 6,370,572 | B1 | * 4/2002 | Lindskog et al. | 709/223 |

OTHER PUBLICATIONS

Darryl P. Black, "Managing Switched Local Area Networks: A Practical Guide", Addisson Wesley, Reading, MA, 1998, Chapters 1, 2 and 10.

Stallings, W.,"SNMP, SNMPv2 and CMIP", Addisson Wesley, Reading, MA, 1993, Chapters 4 and 7.

Douglas E. Comer, "Internetworking with TCP/IP", vol. 1, Prentice Hall, Englewood Cliffs, New Jersey, 1995, Chapters 25 and 26.

Ulysses Black, *Network Management Standards*, Second Edition, McGraw-Hill, Inc., New York, 1994, Chapters 9 and 10.

Mathias Hein and David Griffiths, *Switching Technology in the Local Network*, Thompson Computer Press, London, 1997, Chapter 7 (especially 7.4).

R.M.Metcalfe, "Computer/Network . . . and Ethernet", IEEE Journal on Selected Areas in Communications, Feb. 1993, vol. 11, pp. 173–179.

V. Paxson, "Growth Trends in Wide–Area TCP Connections", IEEE Network Magazine, Jul./Aug. 1994, vol. 8, No. 4, pp. 8–17.

Perry, T.S. and Adam, J.A., "E–mail", IEEE Spectrum, Oct. 1992, vol. 29, No. 10, pp. 4, 22–33.

* cited by examiner

*Primary Examiner*—Bharat Barot
(74) *Attorney, Agent, or Firm*—Fish & Richardson P.C.

(57) ABSTRACT

A network device includes a network interface, monitoring circuitry, and a processor. The network interface is operative to couple the network device to a communications link and to exchange mail message data over the communications link. The monitoring circuitry is configured to monitor an operating state of the network device and to detect an alarm condition. The processor is operatively coupled to the network interface, the monitoring circuitry, and to a memory. The memory includes executable instructions for causing the processor to send a mail message to report a detected alarm condition when the monitoring circuitry detects the alarm condition. A method of reporting device status data includes detecting an alarm condition at a network device and sending a mail message to a recipient device to report the alarm condition.

21 Claims, 3 Drawing Sheets

NETWORK DEVICE MONITORING WITH E-MAIL REPORTING

Priority based on U.S. provisional patent application Ser. No. 60/082,492 filed Apr. 21, 1998 entitled "Network Device Monitoring" is claimed.

BACKGROUND

FIG. 1 shows a computer network 100. The network 100 includes nodes 101–109 that send and receive data over interconnecting communications media 131–139. The nodes include computer work stations 101–105, a bridge 109 and switches or routers 106–108. Communications media 131–139 can include twisted-pair wire, coaxial cable, fiber optic cable, radio, infrared and microwave data links, and other data interconnections. The data connections 131–139 may be 'point-to-point' connections or shared media local area network connections.

Business and individual users may rely on nodes in a computer network for data exchange, information storage, and other information services. As user's reliance on a computer network increases, so too do reliability demands. To help meet user reliability demands, sub-components of a network may be monitored to detect alarm conditions such as actual or predicted equipment failure and/or degraded equipment operation. When an alarm condition is detected, efficient reporting of the alarm condition is needed so that automatic or manual problem correction procedures can be initiated. For example, when an alarm condition is reported, a technician may be dispatched to correct the problem or an automated algorithm may be executed to reconfigure network equipment so as to correct or minimize the impact of the detected problem condition.

Network nodes can report alarm conditions to a central operations, administration, maintenance, and provisioning (OAMP) work station over a direct dial-up connection to that work station. FIG. 2 shows a network having nodes 201–204 that communicate with an OAMP work station 210 using direct dial-up data links 205–208. The dial-up data links 205–208 may be received at the work station 210 using individual modems 211–214. The modems 211 can exchange modulated data over voice-grade telephone connections through a plain old telephone service (POTS) phone network 220 to modem circuitry in the nodes 201–204. The nodes 201–204 may also communicate with other nodes using network communications links 231–235. The network links may be Internet protocol (IP)-based links allowing for the exchange of packets of data over a wide-area TCP/IP network.

Node 201–204 can perform self-monitoring to detect alarm conditions. When an alarm condition is detected, the nodes 201–204 can respond by dialing a phone number to establish a dial-up connection with the OAMP work station 210 through the phone network 220. OAMP data identifying the alarm condition may then be sent from the node 201–204 to the work station 210.

In the network 200, each node 201–204 relies on a separate dial-up phone connection 205–208 to exchange OAMP data with the work station 210. The use of numerous phone lines 205–208 for OAMP data exchange may be an additional sources or network problems and may add to the cost of operating the data network 200.

Network nodes also may use the Simple Network Management Protocol (SNMP) to exchange OAMP data over network links that can be shared by data traffic between nodes. For example, referring to FIG. 2, the SNMP protocol can be used to exchange OAMP data over network links 231–235 using the user datagram protocol (UDP). UDP is an Internet data transport protocol for the exchange of datagrams that does not acknowledge or guarantee delivery. Since UDP does not acknowledge or guarantee delivery, lost data sent using the UDP protocol may not be detected.

The present inventors recognize that methods of transferring OAMP data, such as the use of dedicated dial-up phone lines and the transfer of SNMP data over a UDP/IP connection, may not be adequate for all network architectures. Consequently, alternative means of exchanging OAMP data are provided.

SUMMARY

In general, in one aspect, the invention features a method of reporting device status data. The method includes detecting an alarm condition at a network device and sending a mail message to a recipient device to report the alarm condition.

Implementations may include one or more of the following features. Sending a mail message may include formatting a mail message that includes data to report the alarm condition and a recipient mail address. The recipient device may be a simple mail transfer protocol (SMTP) server. Sending the mail message to the recipient may include routing the mail message through an intermediate mail server to the recipient. Detecting an alarm condition may include monitoring a data communications link to detect a communication error and/or detecting an operating condition outside an operating threshold. Data associated with the detecting alarm condition may be stored and stored data may be aggregated before it is sent. Sending the mail message to report the alarm condition may include sending aggregated alarm data.

In general, in another aspect, the invention features a network device. The device includes a network interface, monitoring circuitry, and a processor. The network interface is operative to couple the network device to a communications link and to exchange mail message data over the communications link. The monitoring circuitry is configured to monitor an operating state of the network device and to detect an alarm condition. The processor is operatively coupled to the network interface, the monitoring circuitry, and to a memory. The memory includes executable instructions for causing the processor to send a mail message to report a detected alarm condition when the monitoring circuitry detects the alarm condition.

Implementations may include one or more of the following features. The memory may also include instructions for causing the processor to transmit the mail message using the simple mail transfer protocol and/or instructions for causing the processor to form the mail message. The monitoring circuitry may include network interface circuitry to detect the operating state of a communications link.

The details of one or more embodiments of the invention are set forth in the accompanying drawings and the description below. Implementations may provide advantages such as improved reliability in the reporting of network device operating errors, status information, or other device operating information. Other features, objects, and advantages of the invention will be apparent from the description and drawings, and from the claims.

DETAILED DESCRIPTION

Figure 1:
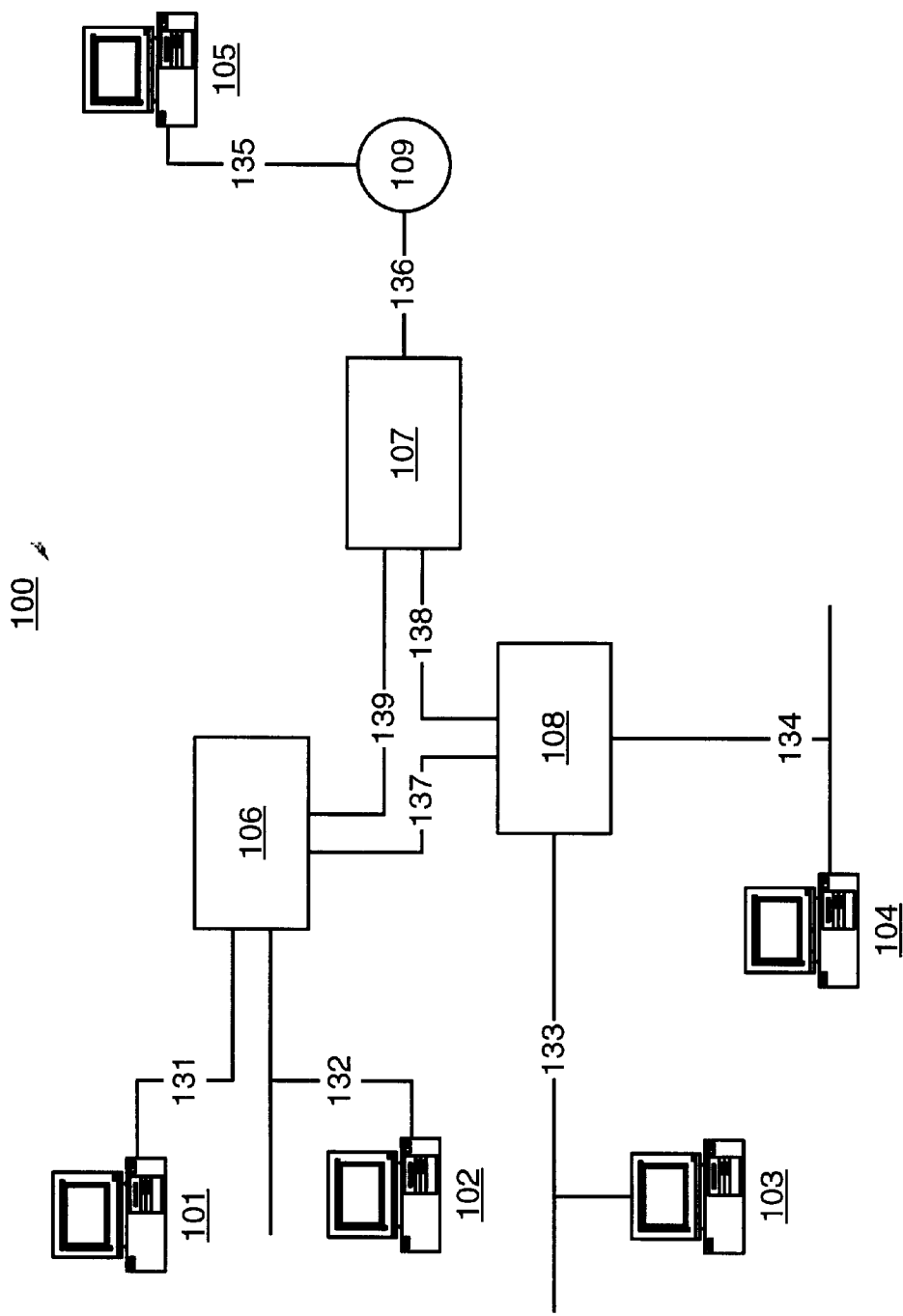
FIG. 1 illustrates a network.
Figure 2:
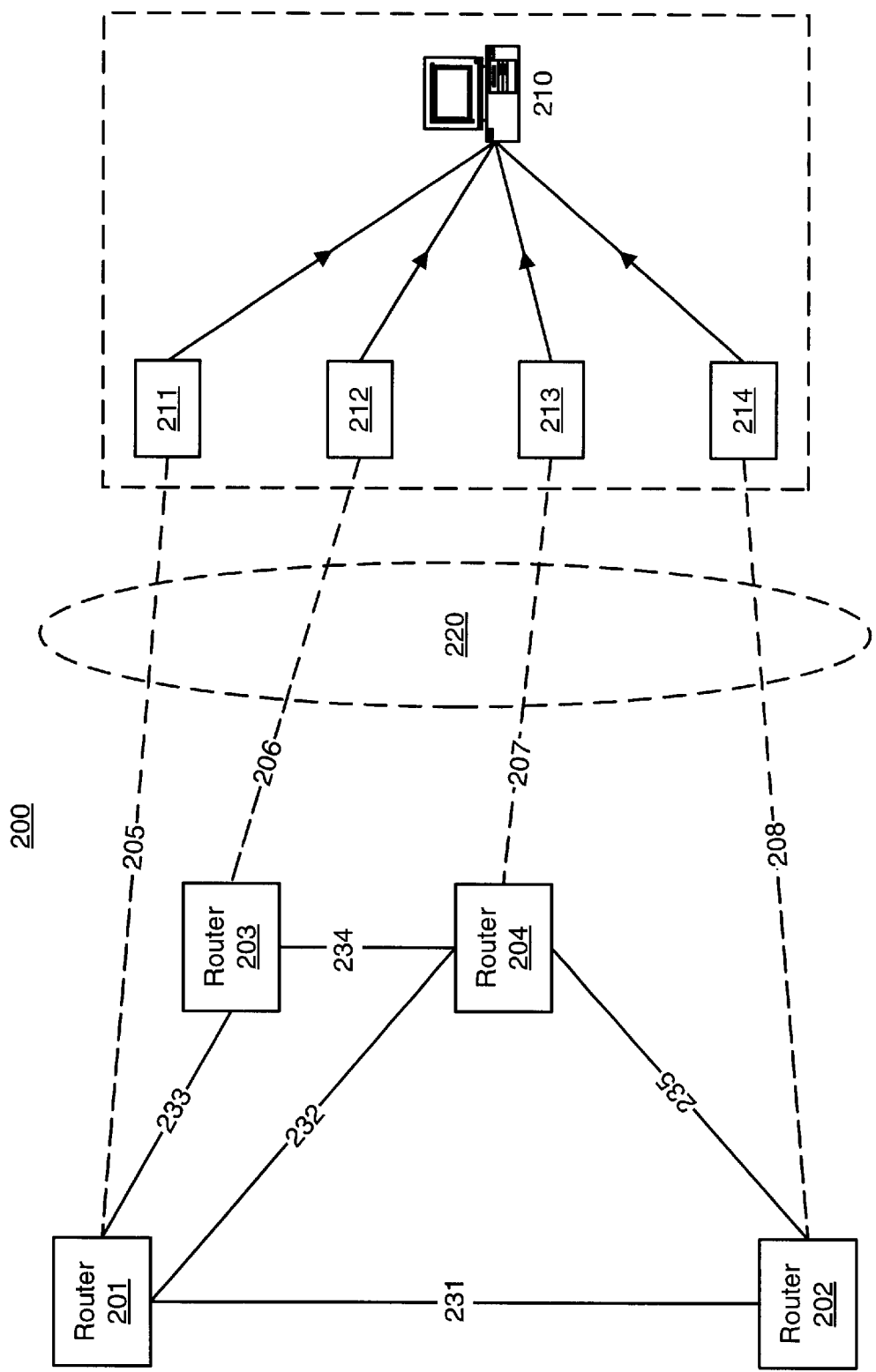
FIG. 2 illustrates prior art network monitoring.
Figure 3:
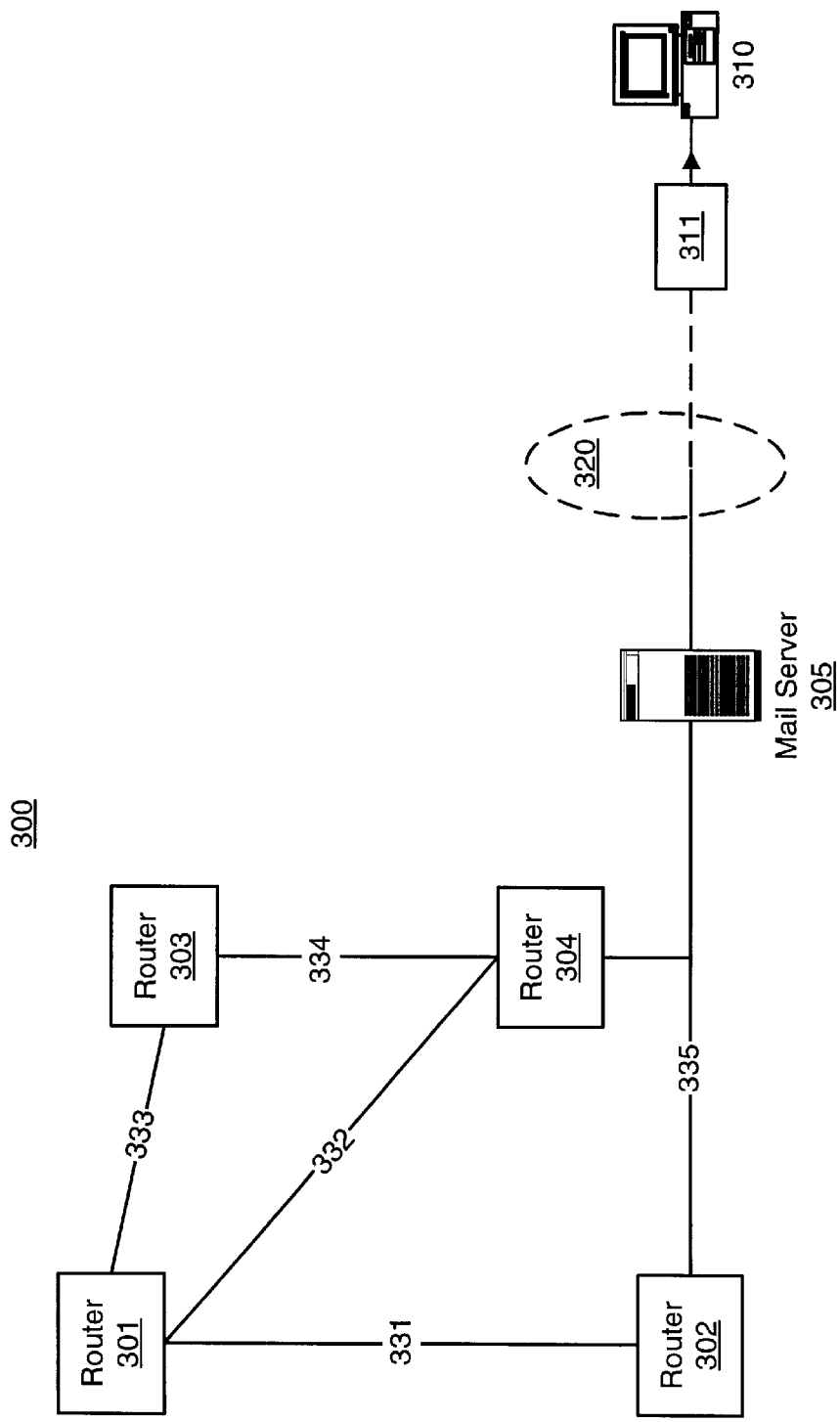
FIG. 3 illustrates network monitoring, according to the invention.

OAMP data may be transferred between a network node and an OAMP work station using a mail messaging protocol, such as the simple mail transfer protocol (SMTP). FIG. 3 shows a network 300 in which nodes 301–304 send OAMP data to network operations work station 310 using SMTP mail messages that are originated at the nodes and routed through the network 300 to a SMTP mail server 305. The mail messages can then be retrieved from the server 305 by the OAMP work station 310 and the OAMP data can be extracted from the retrieved mail messages.

Nodes 301–304 can include self-monitoring circuitry to detect alarm conditions. For example, each node 301–304 may have self-monitoring circuitry that detects bit errors on communications links 331–335. If the number of detected bit errors exceeds an acceptable threshold, the monitoring circuitry will detect that an alarm condition exists. When an alarm condition is detected, a node can form a mail message that includes OAMP data associated with the alarm condition. The OAMP data may include information identifying the alarm condition, the data and time at which the alarm was detected, information detailing a current configuration of the node, and statistical information related to the node's operation. The formed mail message may then be sent from the node to a OAMP work station 310.

To send the mail message to OAMP work station 310, a node 301–304 selects a recipient mail address associated with the OAMP work station. The recipient mail address may identify a user account on a SMTP server 305 that can be accessed by the OAMP work station. In a SMTP implementation, a recipient mailing address will typically include an alphanumeric user account name and a network address associated with a destination SMTP mail server 305. The network address may be converted to an IP address by a IP domain name server (DNS).

A node 301–304 can be programmed to use different recipient addresses. The different recipient addresses may be associated with different OAMP work stations, different SMTP servers, or different mail accounts accessible by an OAMP work station. For example, OAMP work station 310 may be able to access mail stored in three different mail accounts ("power", "link", and "general") at SMTP mail server 305. A node 301–304 can direct a mail messages to either the "power", "link", or "general" mail accounts using a recipient mail addresses associated with the account. As an example, in an SMTP implementation in which the SMTP server 305 has been assigned the network address "mailserver.com", the recipient addresses of the "power", "link", and "general" accounts may be "power@mailserver.com", "link@mailserver.com" and "general@mailserver.com", respectively.

A node can select a recipient addresses based on the alarm condition detected. For example, if an alarm condition related to power and battery status is detected, a mail message may be sent to the "power@mailserver.com" address, if an alarm condition related to a communications link status is detected, a mail message may be sent to "link@mailserver.com" address, and if other types of alarm condition messages are detected, they may be sent to the "general@mailserver.com" address. Recipient mail addresses can also be selected based on a known mail message travel path. For example, a node may include a table indicating that mail messages to a first recipient address are to be directed over a first link to a first SMTP server 305 and mail messages to a second recipient address are to be directed over a second communications link toward a second SMTP server. If the node detects an alarm condition indicating that the first link has failed, the node may then select a recipient mail directed over the second link. The second SMTP server may be an intermediate SMTP server with an alternate connection to the server 305 and which may subsequently forward received mail to the server 305. A mail message may pass through multiple intermediate SMTP servers between a node initiating the message and its final destination.

The OAMP work station 310 may access OAMP message that have reached the SMTP server 305 using standard mail client protocols. For example, the OAMP work station may implement the post office protocol (POP) or a SMTP client protocol to access mail from the SMTP server 305. Other mail access protocols also may be used. To access the SMTP server 305, the OAMP work station 310 may use a modem 311 to establish a data connection through an analog phone network 320. The SMTP server may also use a direct network connection to access the SMPT server 305. For example, the SMTP server 305 and the OAMP work station 310 may both be connected to the Internet and may communicate using TCP/IP connections over the Internet.

OAMP mail message received by the OAMP work station 310 can be used to trigger data gathering or corrective procedures. For example, an OAMP mail message from node 303 may report a detected bit error rate. The work station 310 may process the OAMP mail message and determine that the bit error information should be added to a statistical database for use in subsequent error prediction. Alternatively, the work station may determine that the bit error information indicates that immediate corrective action is necessary. The corrective action may include, for example, displaying a message to an operator of the work station 310 indicating that a technician should be dispatched. Corrective actions can be automated. For example, a work station operator or an automated algorithm may determine that node 303 operating parameters are to be changed in response to the bit error information. The work station 310 may then send a mail message to the SMTP server 305 that is accessible by the node 303. The mail message sent to the node 303 can include new node configuration data.

If a connection with a destination mail server cannot be established, a mail message may be stored and the storing device can periodically attempt to send the message to the destination mail server. For example, if a link to a destination SMTP server has failed, an intermediate mail server may store mail messages being sent to the destination SMTP server, and may periodically attempt to connect to the SMTP server to deliver the OAMP message.

The present invention provides self monitoring network nodes that can communicate OAMP messages using existing network capabilities. According to the invention, a network node, such as a workstation, router, bridge, or gateway may include mail message generation and/or transmission capabilities. Implementations of the invention can provide for full-time monitoring of network device and reliable alarm and warning data transfer to human operators or automated operations systems. Additionally, data may be transferred globally.

Implementations may use a variety of data communication and mail messaging protocols. For example, in an IPX network implementation, the Novell® IPX protocol may be used in place of the TCP/IP protocol. The SMTP protocol also may be replaced by an alternate mail transfer protocols such as Lotus Notes® Mail or Microsoft Exchange® mail protocols.

OAMP data sent from a node may include data specifying the nodes current configuration, data identifying network link usage statistics, failures, errors, and/or overflows, and data indicating whether the node is using a primary or a secondary (battery-backup) power source. Other OAMP data also can be sent.

A node may store and aggregate alarm data before sending the data in a mail message. For example, when a node detects an alarm condition, the node may store alarm data in an internal database. Alarm data from subsequently detected alarms may be aggregated together with the alarm data in the internal database. The aggregated data may be sent to a OAMP work station at scheduled time periods, after a particular number of alarms have been detected, or at other times. OAMP work station 310 may determine when nodes 301–304 can send OAMP data to the work station 310. For example, the OAMP work station 310 can send a mail message to a node 301–304 when the work station 310 is ready to receive OAMP data from the node. In response, the node may format OAMP data into a mail message and sent it to the OAMP work station. Formatting a mail message can include inserting data in a body portion of a mail message.

Additional documentation describing SMTP mail messaging is available from the Internet engineering task force (IETF). In particular, the SMTP mail message format is documented in IETF request for comment (RFC) document RFC 822. The protocol used to exchange SMTP messages between clients and servers is documented in IETF document RFC 821.

As used herein, the term "routed" can refer to media access controller (MAC) protocol layer routing as well as routing by devices operating at higher protocol layers, such as network switches, IP switching devices, bridges, and gateways.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, OAMP mail messages may be periodically sent to an OAMP work station in the absence of a detected alarm condition to report a node's operating status. Accordingly, other embodiments are within the scope of the following claims.

What is claimed is:

1. A network device comprising:
    a network interface operative to couple the network device to a communications link and operative to exchange mail message data over the communications link;
    monitoring circuitry configured to monitor an operating state of the communications link and to detect an alarm condition related to the operating state of the communications link; and
    a processor operatively coupled to the network interface, the monitoring circuitry, and to a memory, the memory comprising executable instructions for causing the processor to send a message defined by an electronic mail messaging protocol to a recipient device to report a detected alarm condition when the monitoring circuitry detects the alarm condition.

2. The network device of claim 1, wherein the memory further comprises instructions for causing the processor to transmit the mail message using the simple mail transfer protocol.

3. The network device of claim 1, wherein the memory further comprises instructions for causing the processor to form the mail message.

4. The network device of claim 1, wherein the memory further comprises instructions for causing the processor to select the recipient mail address based on a travel path of the mail message from the network device to a recipient device.

5. The network device of claim 4, wherein the memory farther comprises instructions for causing the processor to select the recipient mail address corresponding to a travel path that does not use the communications link corresponding to the detected alarm condition.

6. A method of reporting device status data comprising:
    detecting an alarm condition at a network device connected to a network, the alarm condition related to an operating condition of a communications link in the network; and
    sending a message defined by an electronic mail messaging protocol to a recipient device to report the alarm condition.

7. The method of claim 1 wherein sending a mail message comprises formatting a mail message comprising data to report the alarm condition and a recipient mail address.

8. The method of claim 7, wherein the recipient device comprises a simple mail transfer protocol (SMTP) server.

9. The method of claim 7, wherein sending the mail message to the recipient comprises routing the mail message through an intermediate mail server to the recipient.

10. The method of claim 9, wherein selecting the recipient mail address comprises selecting the mail address corresponding to a travel path of the mail message from the network device to the recipient device.

11. The method of claim 10, further comprising selecting a mail address corresponding to a travel path that does not use the communications link corresponding to the detected alarm condition.

12. The method of claim 9, wherein detecting an alarm condition comprises detecting an operating condition outside an operating threshold.

13. The method of claim 6, further comprising storing data associated with the detected alarm condition.

14. The method of claim 13, further comprising aggregating the stored data associated with the detected alarm condition together with stored data associated with other alarm conditions to form aggregated alarm data; and wherein sending the mail message to report the alarm condition comprises sending the aggregated alarm data.

15. An article comprising a machine-readable medium that stores machine-executable instructions for reporting device status, the instructions causing a machine to:

detect an alarm condition at a network device connected to a network, the alarm condition related to an operating condition of a communications link in the network; and send a message defined by an electronic mail messaging protocol to a recipient device to report the alarm condition.

16. The article of claim 15, wherein sending the mail message comprises formatting a mail message comprised of data to report the alarm condition and a recipient mail address.

17. The article of claim 16, wherein the recipient device comprises a simple mail transfer protocol (SAP) server.

18. The article of claim 16, wherein sending the mail message comprises routing the mail message through an intermediate mail server to the recipient.

19. The article of claim 18, wherein detecting an alarm condition comprises detecting an operating condition outside an operating threshold.

20. The article of claim 15, further comprising instructions causing a machine to store data associated with the detected alarm condition.

21. The article of claim 20, further comprising instructions causing the machine to:

aggregate the stored data associated with the detected alarm condition together with stored data associated with other alarm conditions to form aggregated alarm data and, wherein instructions causing the machine to send the mail message to report the alarm condition comprises instructions causing the machine to send the aggregated alarm data.

* * * * *